United States Patent
Mulholland et al.

(10) Patent No.: US 12,282,673 B2
(45) Date of Patent: Apr. 22, 2025

(54) LIMITING DEDUPLICATION SEARCH DOMAINS

(71) Applicant: INTERNATIONAL BUSINESS MACHINES CORPORATION, Armonk, NY (US)

(72) Inventors: Miles Mulholland, Eastleigh (GB); Imran Imtiaz, Manchester (GB); Anuj Chandra, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 18/189,027

(22) Filed: Mar. 23, 2023

(65) Prior Publication Data
US 2024/0319900 A1   Sep. 26, 2024

(51) Int. Cl.
*G06F 3/06*   (2006.01)

(52) U.S. Cl.
CPC .......... *G06F 3/0641* (2013.01); *G06F 3/0608* (2013.01); *G06F 3/067* (2013.01); *G06F 3/0683* (2013.01)

(58) Field of Classification Search
CPC ...... G06F 3/0641; G06F 3/0608; G06F 3/067; G06F 3/0683
See application file for complete search history.

(56) References Cited

U.S. PATENT DOCUMENTS

| | | | | |
|---|---|---|---|---|
| 8,396,841 B1* | 3/2013 | Janakiraman | ......... | G06F 3/0608 707/802 |
| 8,429,359 B1* | 4/2013 | Desai | ................. | G06F 11/1461 711/E12.103 |
| 8,538,919 B1* | 9/2013 | Nielsen | ............... | H04L 63/0272 718/1 |
| 8,572,163 B1* | 10/2013 | Bromley | ............. | G06F 16/1748 707/650 |
| 8,593,678 B2* | 11/2013 | Ohishi | ................. | H04N 1/2166 358/1.15 |
| 8,732,403 B1* | 5/2014 | Nayak | .................... | G06F 3/0619 711/170 |
| 9,075,705 B2* | 7/2015 | Hikichi | ................. | G06F 11/004 |
| 9,092,182 B2* | 7/2015 | Ohishi | ............... | H04N 1/00944 |
| 9,344,596 B2* | 5/2016 | Ohishi | ............... | H04N 1/00973 |
| 9,715,434 B1* | 7/2017 | Xu | ........................... | G06F 3/067 |
| 9,733,836 B1* | 8/2017 | Garg | .................... | G06F 3/0631 |

(Continued)

FOREIGN PATENT DOCUMENTS

WO   WO-2013157103 A1 *  10/2013   ........... G06F 3/0608

*Primary Examiner* — Christopher D Birkhimer
(74) *Attorney, Agent, or Firm* — KONRAD, RAYNES, DAVDA & VICTOR LLP; Rabindranath Dutta

(57) ABSTRACT

A remote copy relationship is maintained between a local computational device and a remote computational device for a first storage volume and a second storage volume. The local computational device transmits information to the remote computational device, wherein the information indicates that there are no deduplication matches between the first storage volume and the second storage volume in the local computational device, and wherein the remote computational device is configured to avoid scanning for deduplication matches between a remote copy of the first storage volume and a remote copy of the second storage volume based on the information that is transmitted.

20 Claims, 6 Drawing Sheets

(56) References Cited

U.S. PATENT DOCUMENTS

| | | | |
|---|---|---|---|
| 9,800,291 B1* | 10/2017 | Ben David | G06F 11/1415 |
| 10,108,543 B1* | 10/2018 | Duggal | G06F 11/14 |
| 10,108,544 B1* | 10/2018 | Duggal | G06F 11/14 |
| 10,228,858 B1* | 3/2019 | Stoakes | G06F 3/0641 |
| 10,346,076 B1* | 7/2019 | Jonnala | G06F 3/067 |
| 10,656,859 B2 | 5/2020 | Jain et al. | |
| 10,664,165 B1* | 5/2020 | Faibish | G06F 3/0638 |
| 10,671,569 B2 | 6/2020 | Aronovich | |
| 10,789,213 B2* | 9/2020 | Aronovich | G06F 16/1752 |
| 10,795,812 B1* | 10/2020 | Duggal | G06F 3/067 |
| 10,872,061 B2 | 12/2020 | Angadi et al. | |
| 2004/0117414 A1* | 6/2004 | Braun | G06F 8/65 |
| 2006/0005074 A1* | 1/2006 | Yanai | G06F 11/2066 714/6.32 |
| 2008/0140902 A1* | 6/2008 | Townsend | H04B 1/0475 710/306 |
| 2008/0144079 A1* | 6/2008 | Pandey | H03M 7/30 358/1.15 |
| 2008/0307020 A1* | 12/2008 | Ko | G06F 21/6245 |
| 2009/0041230 A1* | 2/2009 | Williams | G06F 11/1448 707/999.204 |
| 2009/0089483 A1* | 4/2009 | Tanaka | G06F 3/0608 711/E12.008 |
| 2009/0204650 A1* | 8/2009 | Wong | G06F 16/1744 |
| 2009/0216973 A1* | 8/2009 | Nakajima | G06F 11/1451 711/E12.103 |
| 2010/0077013 A1* | 3/2010 | Clements | G06F 16/1748 707/822 |
| 2010/0082672 A1* | 4/2010 | Kottomtharayil | G06F 11/1451 711/E12.001 |
| 2010/0088296 A1* | 4/2010 | Periyagaram | G06F 16/183 707/E17.014 |
| 2010/0125553 A1* | 5/2010 | Huang | G06F 11/1453 707/661 |
| 2010/0174881 A1* | 7/2010 | Anglin | G06F 11/1453 711/E12.103 |
| 2010/0281081 A1* | 11/2010 | Stager | G06F 9/5022 707/814 |
| 2010/0333116 A1* | 12/2010 | Prahlad | G06F 3/0649 713/153 |
| 2011/0236049 A1* | 9/2011 | Haga | G03G 15/5004 399/75 |
| 2013/0024423 A1* | 1/2013 | Doshi | G06F 11/1448 707/640 |
| 2013/0173554 A1* | 7/2013 | Ubukata | G06F 11/2094 707/640 |
| 2014/0114932 A1* | 4/2014 | Mallaiah | G06F 3/0641 707/E17.032 |
| 2015/0019500 A1* | 1/2015 | Aronovich | G06F 16/1752 707/692 |
| 2015/0019504 A1* | 1/2015 | Aronovich | G06F 16/1752 707/692 |
| 2015/0205816 A1* | 7/2015 | Periyagaram | G06F 11/1453 707/827 |
| 2015/0261776 A1* | 9/2015 | Attarde | G06F 16/1748 707/664 |
| 2016/0246799 A1* | 8/2016 | Constantinescu | G06F 16/1748 |
| 2016/0350324 A1* | 12/2016 | Wang | G06F 16/137 |
| 2017/0010809 A1* | 1/2017 | Hironaka | G06F 3/0689 |
| 2017/0038978 A1* | 2/2017 | Li | G06F 3/0611 |
| 2017/0132082 A1* | 5/2017 | Resch | G06F 11/1076 |
| 2017/0344734 A1* | 11/2017 | Zhou | G06F 21/32 |
| 2018/0138921 A1* | 5/2018 | Arelakis | H03M 7/3071 |
| 2018/0314727 A1* | 11/2018 | Epstein | G06N 5/01 |
| 2019/0155921 A1* | 5/2019 | Hasegawa | G06F 16/1748 |
| 2020/0310686 A1* | 10/2020 | Truong | G06F 3/061 |
| 2021/0036714 A1* | 2/2021 | Martin | G06F 13/1668 |
| 2021/0224162 A1* | 7/2021 | Karnik | G06F 11/1451 |
| 2021/0374021 A1* | 12/2021 | Santhakumar | G06F 3/0659 |
| 2022/0100709 A1 | 3/2022 | Shilane | |
| 2022/0283905 A1* | 9/2022 | Paulzagade | G06F 11/1469 |
| 2023/0259429 A1* | 8/2023 | Doddaiah | G06F 3/0653 714/6.3 |

* cited by examiner

LIMITING DEDUPLICATION SEARCH DOMAINS

BACKGROUND

Embodiments relate to a method, system, and computer program product for limiting deduplication search domains.

A storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage controller. A host may send Input/Output (I/O) commands to the storage controller and the storage controller may execute the I/O commands to read data from the storage devices or write data to the storage devices.

Remote copy is a protocol to replicate a storage volume from a first storage controller at a first site to a second storage controller at a second site. The first storage controller may be referred to as a primary storage controller or a local storage controller and the second storage controller may be referred to as a secondary storage controller or a remote storage controller.

Data deduplication which is also known as single instance store or data folding refers to the process of eliminating or significantly reducing multiple copies of the same data. For example, data deduplication may eliminate duplicate files in a storage system or may remove duplicate portions of a single file.

Thin provisioning is a concept where storage does not wholly allocate the advertised capacity. Storage is only allocated when it is to be used. Both block and file systems have equivalents of this: file systems are effectively thin provisioned by their nature (files can only be allocated upon creation), and block storage systems can have thin provisioning implemented using a forward lookup structure to map allocated ranges to the physical storage medium. Storage can either be kept local to a volume, or pooled between multiple volumes. Thin provisioning allows the implementation of advanced space saving techniques, such as compression and deduplication as the system may update the forward lookup structure with the appropriate details.

SUMMARY

Provided are a method, system, and computer program product in which a remote copy relationship is maintained between a local computational device and a remote computational device for a first storage volume and a second storage volume. The local computational device transmits information to the remote computational device, wherein the information indicates that there are no deduplication matches between the first storage volume and the second storage volume in the local computational device, and wherein the remote computational device is configured to avoid scanning for deduplication matches between a remote copy of the first storage volume and a remote copy of the second storage volume based on the information that is transmitted.

In further embodiments, the remote computational device receives the information transmitted from the local computational device. The remote computational device scans for deduplication matches between the remote copy of the first storage volume and a third storage volume maintained in the remote computational device, while avoiding scanning for deduplication matches in the remote computational device between the remote copy of the first storage volume and the remote copy of the second storage volume.

In further embodiments, in response to a deduplication match between two files one of the two files is deleted and a link is maintained to the other to conserve space.

In additional embodiments, deduplication properties of storage volumes between remote copy partners comprising the local computational device and the remote computational device are maintained, along with a measure of confidence level of a determination of the deduplication properties.

In yet additional embodiments, in response to determining that there is no deduplication affinity between storage volumes with a high degree of certainty, the remote computational device restricts a search space for deduplication, wherein the high degree of certainty is beyond a threshold level of certainty.

In further embodiments, high certainty storage volumes which do not deduplicate are pruned from the search space for deduplication candidates in the remote computational device.

In other embodiments, lower certainty storage volumes are deprioritized for purposes of deduplication in the remote computational device, wherein lower certainty volumes are those that are not high certainly storage volumes.

BRIEF DESCRIPTION OF THE DRAWINGS

Referring now to the drawings in which like reference numbers represent corresponding parts throughout.

DETAILED DESCRIPTION

Figure 1:
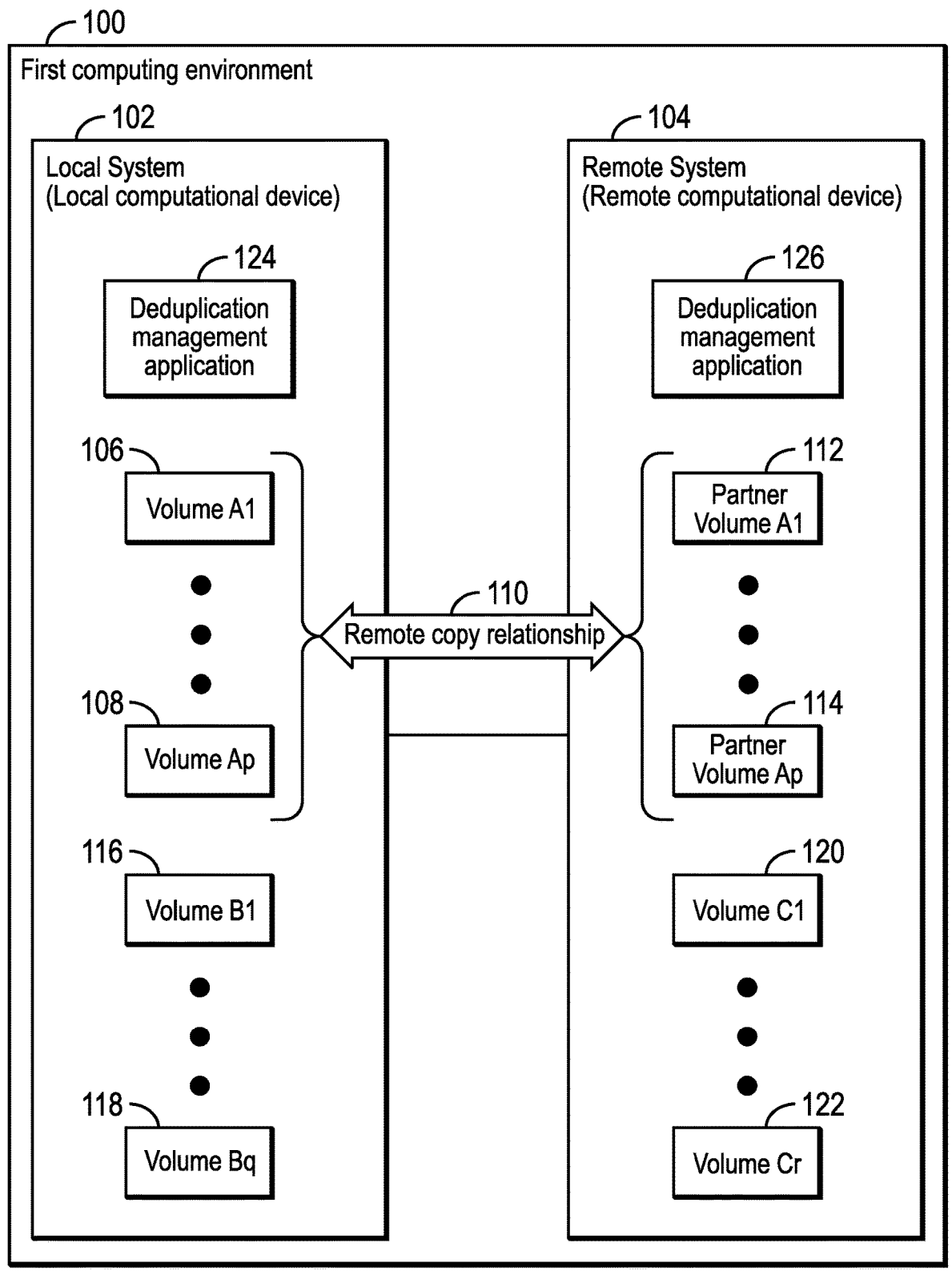
FIG. 1 illustrates a block diagram of a first computing environment for limiting deduplication search domains, in accordance with certain embodiments.

In the following description, reference is made to the accompanying drawings which form a part hereof and which illustrate several embodiments. It is understood that other embodiments may be utilized and structural and operational changes may be made.

Deduplication operates by having an in-memory lookup table to contain partial hashes of recent writes. An incoming I/O may first perform a hash, using an algorithm like SHA-1 or SHA-256 (SHA is an acronym for secure hash algorithm). That hash may then be compared against the lookup table to determine if there may be a match in the system for this I/O. If there is a potential match, the potential match is subject to a lookup to determine if the full hash is located in the storage system. If it is, a reference is created for the virtual address and volume the system is trying to write to, and the location of the potential match is referenced. The size of the in-memory lookup table is one of the factors for determining whether or not a deduplication reference is found. A deduplication lookup may be limited to the memory available within a cluster, and deduplications may be performed within an I/O group.

Copy services are a collection of features which allow storage systems to have disaster recovery integrated into the I/O path. This is achieved via remote copy features by transmitting data to a partner storage system. The backup site (remote or partner site) performs the I/O, notifies the primary site (local site), and the I/O is removed from the pending set.

Certain embodiments provide mechanisms to share the deduplication properties of volumes between remote copy partners, with a measure of the confidence level of this relationship. If it is known that there is no deduplication affinity between volumes with a high degree of certainty, a remote system may be able to restrict its search space for offline deduplication and actions such as rehome. Deduplication rehome occurs when a source grain is no longer in use by the original source volume, but still has references. The deduplication domain is scanned for all referrers that point at the source and one is selected as the new source in order to free up resources. The other referrers are updated to point at this new source. This action can be time consuming, especially as the size of the duplication domain increases. This operation is necessary when deduplication references do not result in back-references on the source volume, which is typically true for storage efficiency purposes. By sharing deduplication properties of volumes between remote clusters, certain embodiments may provide mechanisms to leverage the work of one cluster to save work on many others.

Offline deduplication is performed when data is deduplicated after-the-fact as part of an asynchronous-to-I/O process which continually scans the disk for deduplication matches. This approach can result in high deduplication percentages through exhaustive searching, but does not give immediate space savings.

Online (i.e., inline) deduplication relies on a large fingerprint database to (typically) record recently seen I/O and recently deduplicated entries. Based on this, it is able to find deduplication matches, providing immediate space savings as part of an I/O path, but this approach may miss certain deduplication matches between volumes in the event that the fingerprint database has had to prune itself due to memory constraints.

If it is known that a volume has been scanned exhaustively against another volume, and that no deduplications were found (e.g., two encrypted volumes), then it is desirable to inform remote copy partners which also contain these two volumes that this behavior exists. Based on this, the remote copy partner can trim the search space for certain actions-such as offline deduplication or rehome actions.

Certain embodiments include a notion of 'certainty' as online deduplication may be able to determine what proportion of a volume exists in the fingerprint database through relatively simple means (e.g., by incrementing or decrementing a counter when a volume is added or removed from the database). This property captures the conditions where a volume has a large amount of fingerprints in the database, and still finds no deduplications. In this case there is probably a low affinity between the volumes versus the case where the volume is not present in the fingerprint database (and thus it is not known if there is an affinity between the volumes).

High certainty volumes which do not deduplicate can be pruned from the search space. Lower certainty volumes could be deprioritized for the purposes of offline deduplication. While certain embodiments focus on replication domains, as these are typically boundaries for deduplication domains, this knowledge could be shared between deduplication domains on a local system (e.g., in the event of volume mirroring between two deduplicated pools).

Normally, work would be duplicated between systems if searching for deduplications. Certain embodiments provide mechanisms to limit the search space based on the findings of remote clusters. This allows for more efficient deduplication, thereby finding more matches in the same amount of time. Therefore, certain embodiments share the behavior of volumes between clusters in order to restrict deduplication search spaces.

FIG. 1 illustrates a block diagram of a first computing environment 100 for limiting deduplication search domains, in accordance with certain embodiments.

A local system 102 and a remote system 104 are maintained in the computing environment 100. The local system 102 may be referred to as a local computational device and the remote system 104 may be referred to as a remote computational device. In certain embodiments, the local system 102 and the remote system 104 may comprise any suitable computational device including those presently known in the art, such as, a personal computer, a workstation, a server, a mainframe, a hand held computer, a palm top computer, a head mounted computer, a telephony device, a network appliance, a blade computer, a processing device, a controller, etc. The elements shown in FIG. 1 may in any suitable network, such as, a storage area network, a wide area network, the Internet, an intranet, etc., or in a cloud computing environment.

The local system 102 may have plurality of storage volumes 106, 108 that are maintained in a remote copy relationship 110 with a set of corresponding partner storage volume 112, 114 in the remote system 104, wherein storage volumes are also referred to as volumes for the purposes of this disclosure. As updates are made to volumes 106, 108, the updates are propagated to the partner volumes 112, 114 either synchronously or asynchronously such that partner volumes 112, 114 in the remote system 104 are copies of the volumes 106, 108 in the local system 102.

FIG. 1 also shows additional volumes 116, 118 the local system 102 and further additional volumes 120, 122 in the remote system 104 where the volumes 116, 118 of the local system 102 are not in a remote copy relationship with the volumes 120, 122 of the remote system 104.

A deduplication management application 124 executes in the local system 102, and a deduplication management application 126 executes in the remote system 104. In certain embodiments, the deduplication management applications 124, 126 may be implemented in software, firmware, hardware or any combination thereof.

The deduplication management application 124 manages deduplication in the local system 102 and the deduplication management application 126 manages deduplication in the remote system 104. In certain embodiments, the deduplication management application 124 of the local system 102 provides hints to the deduplication management application 126 of the remote system 104. Based on the hints, partner volumes in the remote system 104 may be excluded or included in the search performed for deduplication in the remote system 104.

Figure 2:
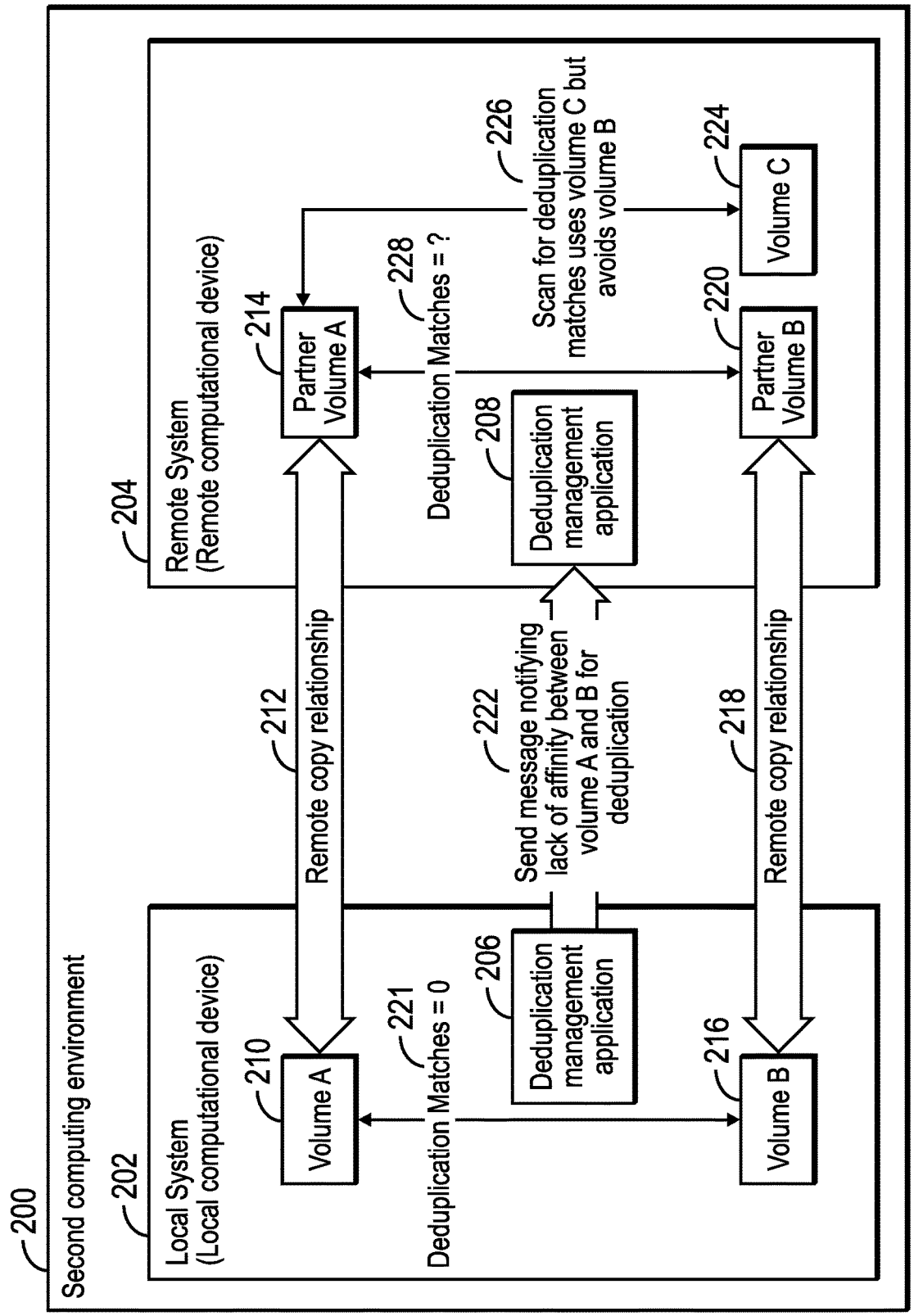
FIG. 2 illustrates a block diagram of a second computing environment for limiting deduplication search domains, in accordance with certain embodiments.

FIG. 2 illustrates a block diagram of a second computing environment 200 for limiting deduplication search domains, in accordance with certain embodiments. In certain embodiments there is a local system 202 and a remote system 204. A deduplication management application 206 executes in the local system 202, and a deduplication management application 208 executes in the remote system 204.

In FIG. 2, volume A 210 in local system 202 is in a remote copy relationship 212 with partner volume A 214 in remote system 204. Additionally, volume B 216 in local system 202 is in a remote copy relationship 218 with partner volume B 220 in the remote system 204.

The deduplication management application 206 of the local system 202 determines that there are zero deduplication matches between volume A 210 and volume B 216 (shown via reference numeral 221). In alternative embodiments there may be fewer than a threshold number of deduplication matches between volume A 210 and volume B 216 as determined by the deduplication management application 206 of the local system 202. The deduplication management application 206 of the local system 202 sends a message notifying a "lack of affinity" between volume A 210 and volume B 216 for deduplication (as shown via reference numeral 222) to the deduplication management application 208 of the remote system 204. The lack of affinity indicates that the deduplication management application 208 of the remote system 204 should ignore the partner volume B 220 when searching for potential deduplications of files in partner volume A 214. So, scans for deduplication matches (as shown via reference numeral 226) may use volume C 224 but may ignore the partner volume B 220. The answer to the question (shown via reference numeral 228) as to whether there are potential deduplication matches are between partner volume A 214 and partner volume B 220 has been provided by the message received by the remote system 204 from the local system 202.

Therefore FIG. 2 shows how volumes are pruned for determining deduplication candidates based on information received by a remote system 204 from a local system.

Figure 3:
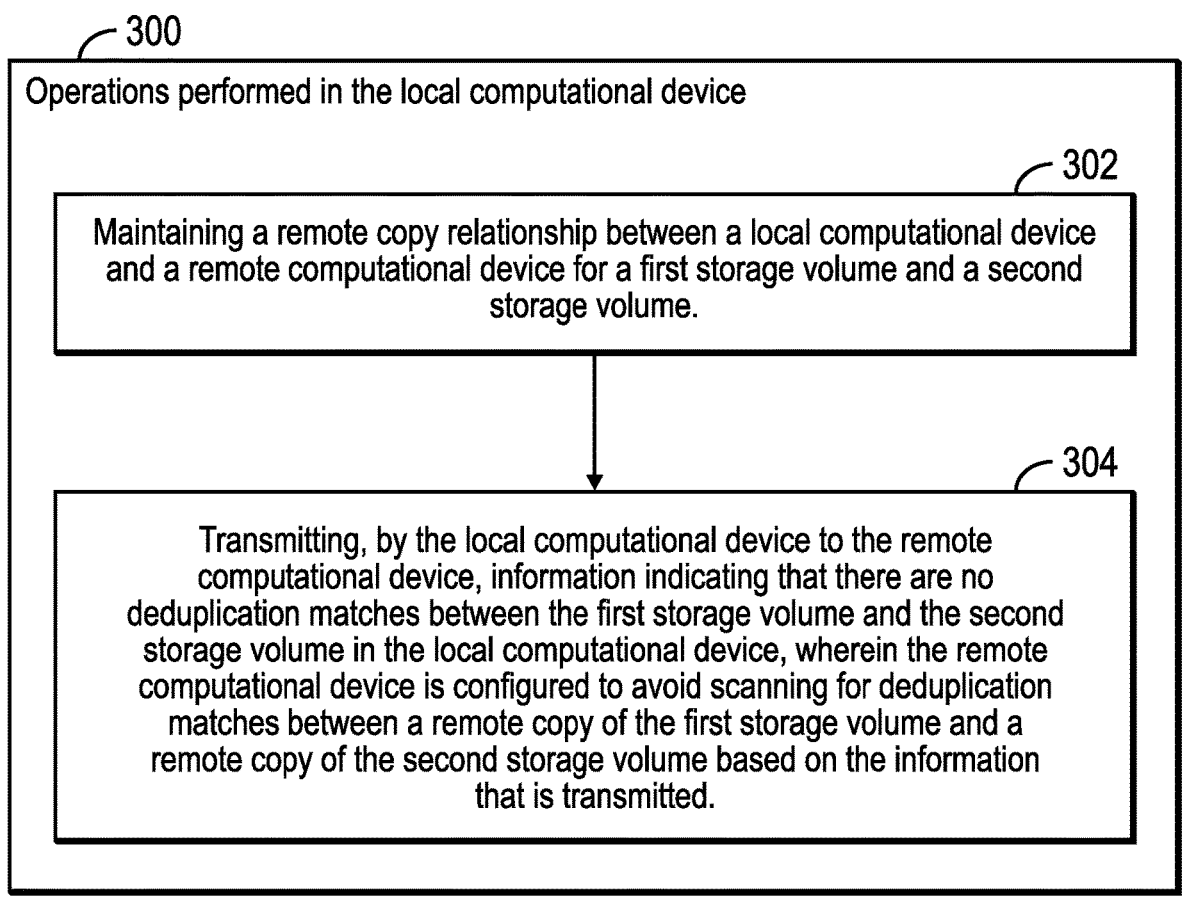
FIG. 3 illustrates a flowchart that shows operations performed in the local computational device, in accordance with certain additional embodiments.

FIG. 3 illustrates a flowchart 300 that shows operations performed in the local computational device, in accordance with certain additional embodiments. In certain embodiments, the operations shown in flowchart 300 may be performed by a deduplication application that executes in the local computational device 102, 202.

A remote copy relationship is maintained between a local computational device 202 and a remote computational device 204 for a first storage volume 210 and a second storage volume 216 (at block 302). The local computational device 202 transmits (at block 304) information to the remote computational device 204, wherein the information indicates that there are no deduplication matches between the first storage volume 210 and the second storage volume 216 in the local computational device 202, and wherein the remote computational device 204 is configured to avoid scanning for deduplication matches between a remote copy 214 of the first storage volume 210 and a remote copy 220 of the second storage volume 216, based on the information that is transmitted.

Figure 4:
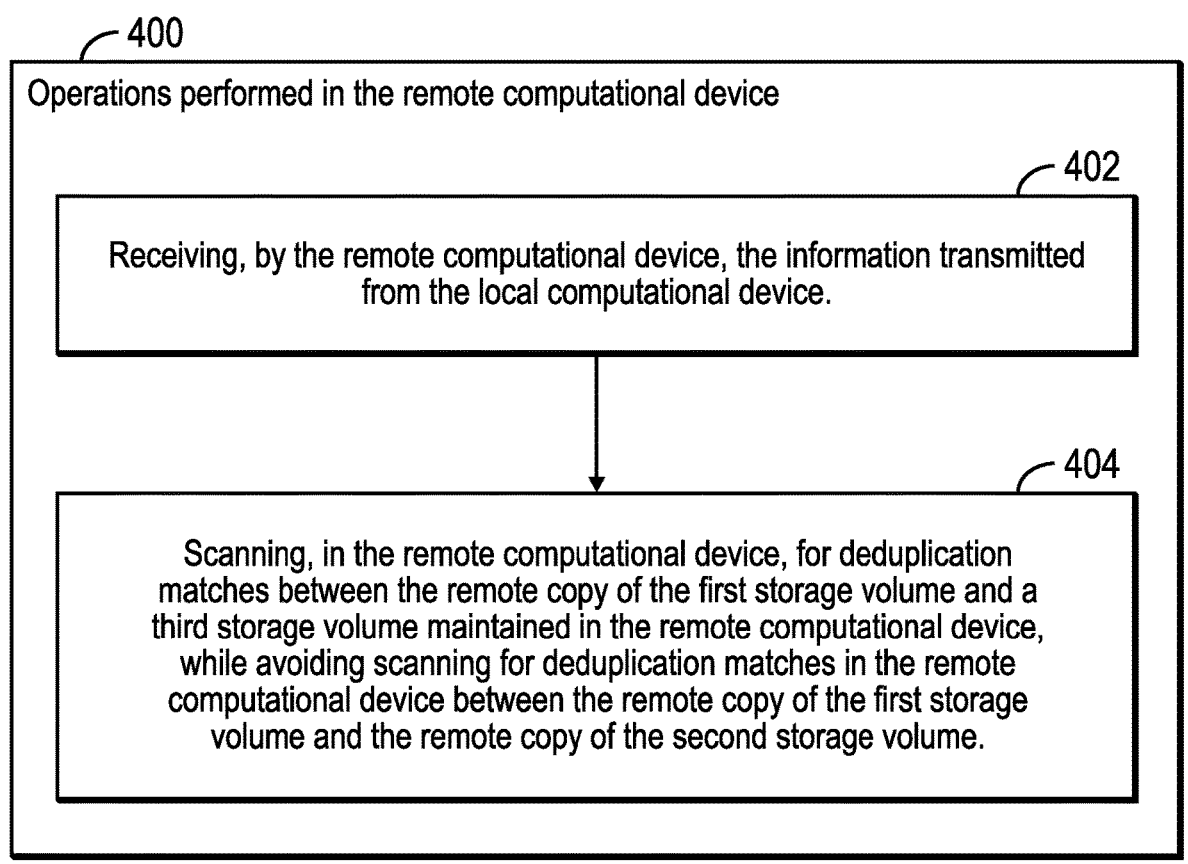
FIG. 4 illustrates a flowchart that shows operations performed in the remote computational device, in accordance with certain additional embodiments.

FIG. 4 illustrates a flowchart 400 that shows operations performed in the remote computational device, in accordance with certain additional embodiments. In certain embodiments, the operations shown in flowchart 400 may be performed by a deduplication application that executes in the remote computational device 104, 204.

The remote computational device 204 receives (at block 402) the information transmitted from the local computational device 202. The remote computational device 204 scans (at block 404) for deduplication matches between the remote copy 214 of the first storage volume 210 and a third storage volume 224 maintained in the remote computational device 204, while avoiding scanning for deduplication matches in the remote computational device 204 between the remote copy 214 of the first storage volume 210 and the remote copy 220 of the second storage volume 216.

Therefore, FIG. 3 and FIG. 4 show embodiments in which the search space for potential deduplication candidates is reduced in the remote computational device 204, based on hints received from the local computational device 202.

Figure 5:
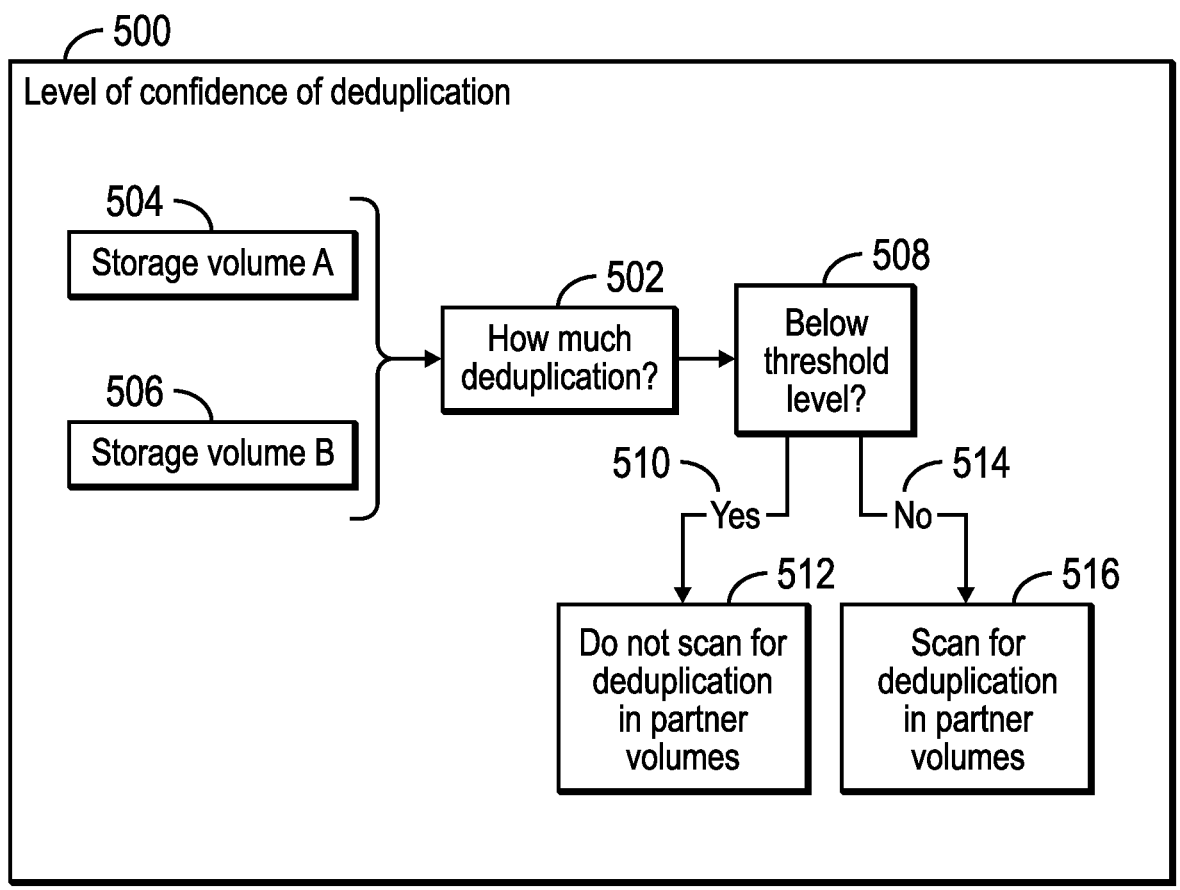
FIG. 5 illustrates a block diagram that shows a level of confidence for deduplication likelihood between two storage volumes, in accordance with certain additional embodiments.

FIG. 5 illustrates a block diagram 500 that shows a level of confidence for deduplication likelihood between two storage volumes, in accordance with certain additional embodiments.

A determination is made as to how much deduplication is there (reference numeral 502) between storage volume 504 and storage volume 506. If the amount of deduplication is below than a threshold (reference numerals 508, 510), then it is indicated to the remote system that partner volumes are not to be scanned for deduplication determination (reference numeral 512). Otherwise, partner volumes are to be scanned for deduplication determination (reference numerals 508, 514, 516).

Therefore, deduplication properties of storage volumes between remote copy partners comprising the local computational device and the remote computational device are maintained, along with a measure of confidence level of a determination of the deduplication properties. In response to determining that there is no deduplication affinity between storage volumes with a high degree of certainty, the remote computational device restricts a search space for deduplication, wherein the high degree of certainty is beyond a threshold level of certainty. High certainty storage volumes which do not deduplicate are pruned from the search space for deduplication candidates in the remote computational device. Lower certainty storage volumes are deprioritized for purposes of deduplication in the remote computational device, wherein lower certainty volumes are those that are not high certainly storage volumes.

Therefore, FIGS. 1-5 illustrate certain embodiments to prune the number of volumes searched for determining deduplication candidates in a remote system based on information provided by a local system. This improves the performance of a computational device during deduplication.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 6:
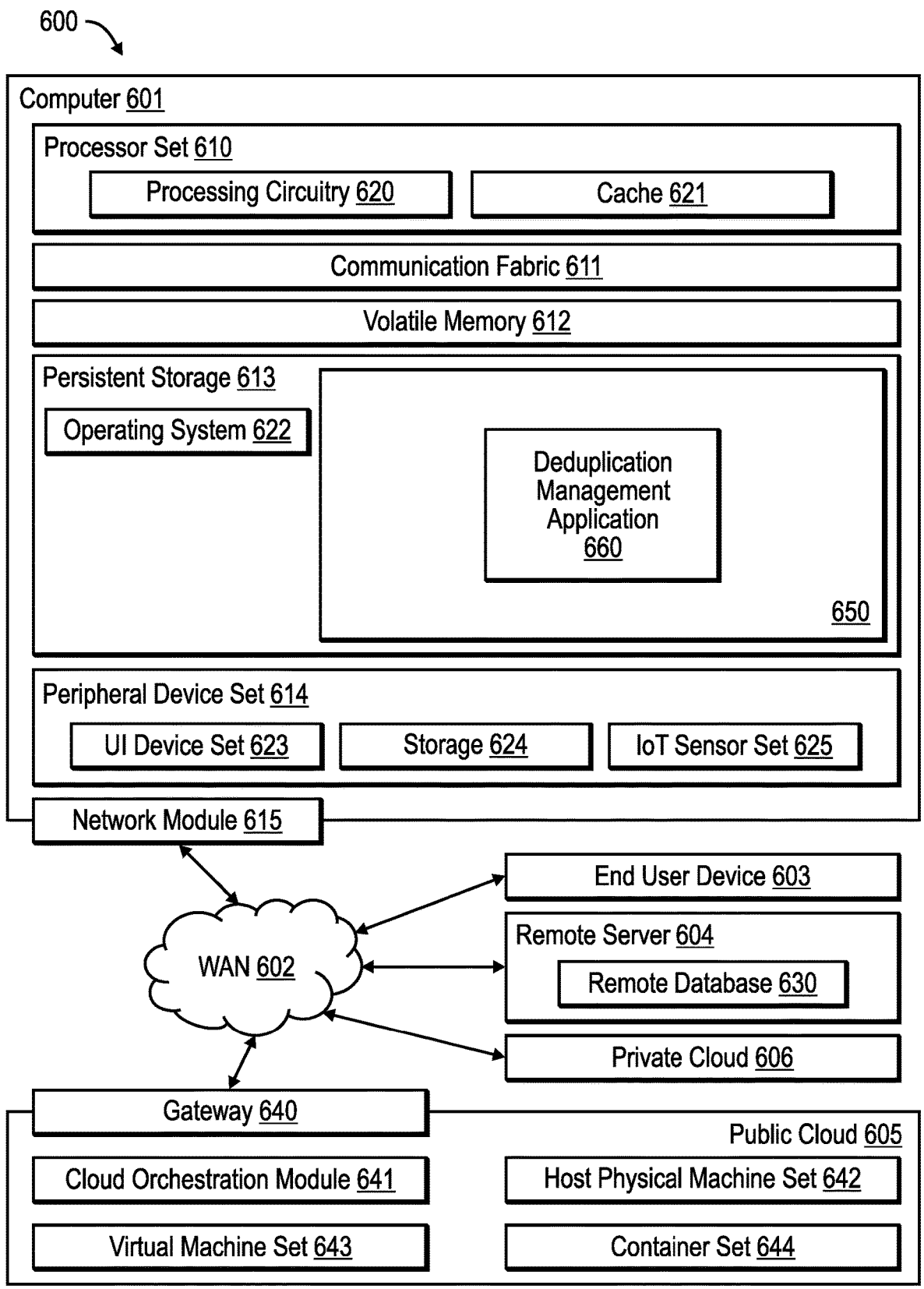
FIG. 6 illustrates a computing environment in which certain components of FIG. 1 and FIG. 2 may be implemented, in accordance with certain embodiments.

In FIG. 6, computing environment 600 contains an example of an environment for the execution of at least some of the computer code (block 650) involved in performing the operations of a deduplication management application 660.

In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. I/O T sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:
1. A method comprising:
maintaining a remote copy relationship between a local computational device and a remote computational device for a first storage volume and a second storage volume; and
transmitting, by the local computational device to the remote computational device, information indicating that there are no deduplication matches between the first storage volume and the second storage volume in the local computational device, wherein the remote computational device is configured to avoid scanning for deduplication matches between a remote copy of the first storage volume and a remote copy of the second storage volume based on the information that is transmitted.

2. The method of claim 1, the method further comprising:
receiving, by the remote computational device, the information transmitted from the local computational device; and
scanning, in the remote computational device, for deduplication matches between the remote copy of the first storage volume and a third storage volume maintained in the remote computational device, while avoiding scanning for deduplication matches in the remote computational device between the remote copy of the first storage volume and the remote copy of the second storage volume.

3. The method of claim 2, wherein in response to a deduplication match between two files one of the two files is deleted and a link is maintained to the other to conserve space.

4. The method of claim 1, wherein deduplication properties of storage volumes between remote copy partners comprising the local computational device and the remote computational device are maintained, along with a measure of confidence level of a determination of the deduplication properties.

5. The method of claim 4, the method further comprising:
in response to determining that there is no deduplication affinity between storage volumes with a high degree of certainty, the remote computational device restricts a search space for deduplication, wherein the high degree of certainty is beyond a threshold level of certainty.

6. The method of claim 1, wherein high certainty storage volumes which do not deduplicate are pruned from a search space for deduplication candidates in the remote computational device.

7. The method of claim 6, wherein lower certainty storage volumes are deprioritized for purposes of deduplication in the remote computational device, and wherein lower certainty storage volumes are those that are not high certainty storage volumes.

8. A system, comprising:
a memory; and
a processor coupled to the memory, wherein the processor performs operations, the operations comprising:

maintaining a remote copy relationship between a local computational device and a remote computational device for a first storage volume and a second storage volume; and transmitting, by the local computational device to the remote computational device, information indicating that there are no deduplication matches between the first storage volume and the second storage volume in the local computational device, wherein the remote computational device is configured to avoid scanning for deduplication matches between a remote copy of the first storage volume and a remote copy of the second storage volume based on the information that is transmitted.

9. The system of claim 8, the operations further comprising:

receiving, by the remote computational device, the information transmitted from the local computational device; and scanning, in the remote computational device, for deduplication matches between the remote copy of the first storage volume and a third storage volume maintained in the remote computational device, while avoiding scanning for deduplication matches in the remote computational device between the remote copy of the first storage volume and the remote copy of the second storage volume.

10. The system of claim 9, wherein in response to a deduplication match between two files one of the two files is deleted and a link is maintained to the other to conserve space.

11. The system of claim 8, wherein deduplication properties of storage volumes between remote copy partners comprising the local computational device and the remote computational device are maintained, along with a measure of confidence level of a determination of the deduplication properties.

12. The system of claim 11, the operations further comprising:

in response to determining that there is no deduplication affinity between storage volumes with a high degree of certainty, the remote computational device restricts a search space for deduplication, wherein the high degree of certainty is beyond a threshold level of certainty.

13. The system of claim 8, wherein high certainty storage volumes which do not deduplicate are pruned from a search space for deduplication candidates in the remote computational device.

14. The system of claim 13, wherein lower certainty storage volumes are deprioritized for purposes of deduplication in the remote computational device, and wherein lower certainty storage volumes are those that are not high certainty storage volumes.

15. A computer program product, the computer program product comprising a computer readable storage medium having computer readable program code embodied therewith, the computer readable program code when executed is configured to perform operations, the operations comprising:

maintaining a remote copy relationship between a local computational device and a remote computational device for a first storage volume and a second storage volume; and transmitting, by the local computational device to the remote computational device, information indicating that there are no deduplication matches between the first storage volume and the second storage volume in the local computational device, wherein the remote computational device is configured to avoid scanning for deduplication matches between a remote copy of the first storage volume and a remote copy of the second storage volume based on the information that is transmitted.

16. The computer program product of claim 15, the operations further comprising:

receiving, by the remote computational device, the information transmitted from the local computational device; and scanning, in the remote computational device, for deduplication matches between the remote copy of the first storage volume and a third storage volume maintained in the remote computational device, while avoiding scanning for deduplication matches in the remote computational device between the remote copy of the first storage volume and the remote copy of the second storage volume.

17. The computer program product of claim 16, wherein in response to a deduplication match between two files one of the two files is deleted and a link is maintained to the other to conserve space.

18. The computer program product of claim 15, wherein deduplication properties of storage volumes between remote copy partners comprising the local computational device and the remote computational device are maintained, along with a measure of confidence level of a determination of the deduplication properties.

19. The computer program product of claim 18, the operations further comprising:

in response to determining that there is no deduplication affinity between storage volumes with a high degree of certainty, the remote computational device restricts a search space for deduplication, wherein the high degree of certainty is beyond a threshold level of certainty.

20. The computer program product of claim 15, wherein high certainty storage volumes which do not deduplicate are pruned from a search space for deduplication candidates in the remote computational device.

* * * * *